US006969934B2

(12) United States Patent
Neubauer et al.

(10) Patent No.: US 6,969,934 B2
(45) Date of Patent: Nov. 29, 2005

(54) METHOD AND DEVICE FOR DECOUPLING AN ACTUATOR FROM A GEAR

(75) Inventors: Achim Neubauer, Sinzheim-Vormberg (DE); Joerg Aschoff, Buehl (DE); Werner Dilger, Buehl (DE); Rolf Pierenkemper, Buehlertal (DE); Martin-Peter Bolz, Buehl (DE); Jochen Moench, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 10/257,348

(22) PCT Filed: Dec. 14, 2001

(86) PCT No.: PCT/DE01/04758

§ 371 (c)(1),
(2), (4) Date: Oct. 10, 2002

(87) PCT Pub. No.: WO02/065618

PCT Pub. Date: Aug. 22, 2002

(65) Prior Publication Data

US 2003/0089195 A1 May 15, 2003

(30) Foreign Application Priority Data

Feb. 14, 2001 (DE) ................. 101 06 724

(51) Int. Cl.⁷ ............................ H02K 7/10

(52) U.S. Cl. ................................ 310/75 R
(58) Field of Search ............ 310/75 R, 75 D, 310/98–100, 78; 74/425, 422; 60/527, 529; 75/425

(56) References Cited

U.S. PATENT DOCUMENTS

| 4,535,261 A | * | 8/1985 | Tsukamoto et al. ........... 310/98 |
| 4,746,826 A | * | 5/1988 | Burney ...................... 310/78 |
| 6,025,663 A | | 2/2000 | Hull |

FOREIGN PATENT DOCUMENTS

| EP | 0 683 852 A | 11/1995 |
| EP | 0 878 895 A | 11/1998 |
| FR | 2 563 285 A | 10/1985 |

* cited by examiner

Primary Examiner—Darren Schuberg
Assistant Examiner—Heba Elkassabgi
(74) Attorney, Agent, or Firm—Michael J. Striker (57) ABSTRACT

The invention is based on a control drive for operating drive components or adjusting components in motor vehicles. The control drive comprises an electric actuator (12) that acts on force-transmitting elements (19, 13; 40, 41). With these, the adjusting motion is transmitted to the drive or adjusting components to be adjusted. A throwout element (19) is provided that interrupts the transmission of force by the force-transmitting elements (10, 13; 40, 41) in the de-energized state (23, 55) of the electric actuator.

30 Claims, 5 Drawing Sheets

METHOD AND DEVICE FOR DECOUPLING AN ACTUATOR FROM A GEAR

BACKGROUND OF THE INVENTION

In the automotive industry, servomotors are often used in commercial vehicles and passenger cars to operate the clutch or as transmission servomotors, for example. Electric servomotors can also be used on components such as exhaust-gas turbochargers to supercharge mixture-compressing internal combustion engines. Exhaust-gas turbochargers were previously operated via the vacuum detected in the intake manifold; a method of operating such exhaust-gas turbochargers in automatable fashion is given by providing an electric drive.

RELATED ART

Servomotors that are typically used as clutch or gear actuators comprise a DC electric motor, on the armature shaft of which a worm is integrated, which said worm meshes with a worm gear; further gear stages can be provided as well. A linear or a rotary motion can be produced using the DC electric motor.

In addition, DC motors can be used as servomotors on add-on components of internal combustion engines, on an exhaust-gas turbocharger, for example. Its turbine rotor drives a compressor wheel, with which a better filling of the cylinders of an internal combustion engine can be achieved. An exhaust-gas turbocharger for internal combustion engines is disclosed in EP 0 683 852 B1. The exhaust-gas turbocharger comprises a drive shaft installed in a housing with bearing means, which said drive shaft joins an exhaust gas-driven turbine rotor with the wheel of a compressor to drive it. Furthermore, a gas-flow controlling device is provided that is positioned upstream from the turbine rotor and serves to adjust the operating power of the exhaust-gas turbocharger. Moreover, an electric servomotor is provided to regulate the operation of the gas-flow controlling device via a linkage means in response to an electrical signal that is at least a function of the outlet pressure of the compressor.

The housing means have a multiple-thread guide screw with an external thread that meshes with a screw member having a matching internal thread. Either the screw member or the guide screw is arranged in such a fashion that it moves generally along a straight line when the guide screw or the screw member rotates. The rotation is therefore converted into movement of the gas-flow controlling device.

If the power to the electric drive designed as a DC motor fails, the motor can either not be adjusted at all, or only by using relatively strong forces. When used in an exhaust-gas turbocharger, said exhaust-gas turbocharger cannot be moved out of the blade ring positions occupied when the power failed. If the blade ring on the exhaust-gas turbocharger is in the closed position, for example—if the exhaust gas cannot flow through it—it must be ensured that the control drive that shut down when the power failed is not damaged by excessive speed when power is suddenly supplied to the exhaust-gas turbocharger.

ADVANTAGES OF THE INVENTION

A number of advantages in terms of adjusting an exhaust-gas turbocharger with an electric control drive in the case of power failure to said electric control drive are achieved by means of the objects attained with the invention that are presented hereinbelow in the exemplary embodiments of the invention.

According to the invention, in the case of electric drives having a worm-gear drive and a spur gear that cooperates with a rack, a shape-memory element can be located between worm-gear drive and spur gear—e.g., a pinion with external teeth—which said shape-memory element can be developed as a heated wire or a heated spring element. The thermal-expansion behavior of the shape-memory element can be used advantageously to establish a non-positive or positive connection between force-transmitting elements designed as a worm gear or a pinion, for example, only when the control drive is energized. If power to the electric actuator is lost, a shape-memory element designed to be heatable is also cut off from the power supply, so that its thermal-expansion behavior causes its shape to change. The change in shape of the shape-memory element, e.g., a spring element composed of a NiTi alloy, causes coupling elements—designed in the shape of pins, for example—to retract from one or more of the force-transmission components, so that they can be adjusted in relation to each other.

If a drive for performing adjustments designed in this fashion is used on an exhaust-gas turbocharger of an internal combustion engine, its turbine adjuster and the de-energized control drive can be decoupled from each other immediately. After decoupling, the frictional forces are so minimal that even minimal flow forces make it possible for the blade ring on the exhaust-gas turbocharger to open safely. Said blade ring is therefore effectively protected from damage if power to the electrical control drive is lost.

As a result of the exemplary embodiment described according to the invention, a gear can be decoupled after slight modifications are made to the control drive, so that proven components can be utilized to the greatest extent possible. When shape-memory elements made of NiTi alloys are used, the functioning temperatures can be set in a wide range. Using NiTi alloys, functioning temperatures of between −30° C. and 350° C. can be achieved.

In a further exemplary embodiment of the idea on which the invention is based, a throwout element can be located directly on the armature shaft of the electric actuator that operates the control drive. In the simplest case, the throwout element can be designed as a spring surrounding the armature shaft of the electric actuator, which said spring is seated against a collar provided on the armature shaft. If power fails, the stop torque—built up by the electromagnetic field—acts between the laminations of the armature and the stator attached to the housing. The throwout element exerts a translational force—which exceeds the positioning force produced by the stop torque—on the armature shaft, so that the entire armature shaft, i.e., including the force-transmitting elements located on it—are decoupled from the further force-transmitting elements.

In the energized state, current is carried through the windings of the electric actuator; the windings are therefore easily held in the operating position by the permanent magnet against the force of a loaded throwout element. Operating position sensors and end position sensors can be provided on the electric actuator without having to make costly modifications to said actuator.

With this exemplary embodiment of the object obtained according to the invention, a space-saving variant can be created by arranging the downstream gear on the armature shaft; the pole pot-type extension, i.e., the extension of the housing of the part of the electric actuator that houses the stator and the armature shaft, can be equipped with a bearing that also supports axial loads, so that only slight changes must be made to existing systems, and the object proposed according to the invention can be realized cost-effectively.

SUMMARY OF THE DRAWINGS

The invention will be described in detail below with reference to the drawings.

FIGS. 4.1, 4.2 show a top view and sectional drawing of the worm gear/pinion arrangement according to FIG. 3 in the de-energized state, FIGS. 5.1, 5.2 show a top view and sectional drawing of the worm gear/pinion arrangement according to FIG. 3 in the energized state, FIG. 6.1 shows an illustration of the worm gear, FIG. 6.2 shows an illustration of the pinion, FIG. 6.3 shows an illustration of the throwout element.

DESCRIPTION OF THE PREFERRED EMBODIMENTS

Figure 1:
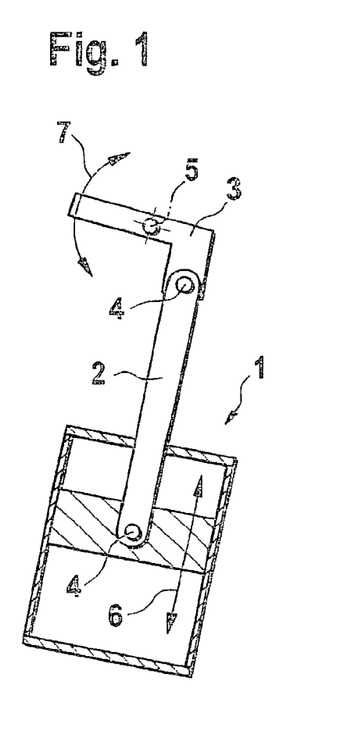
FIGS. 1, 2 show the known control drives in the related art.
Figure 2:
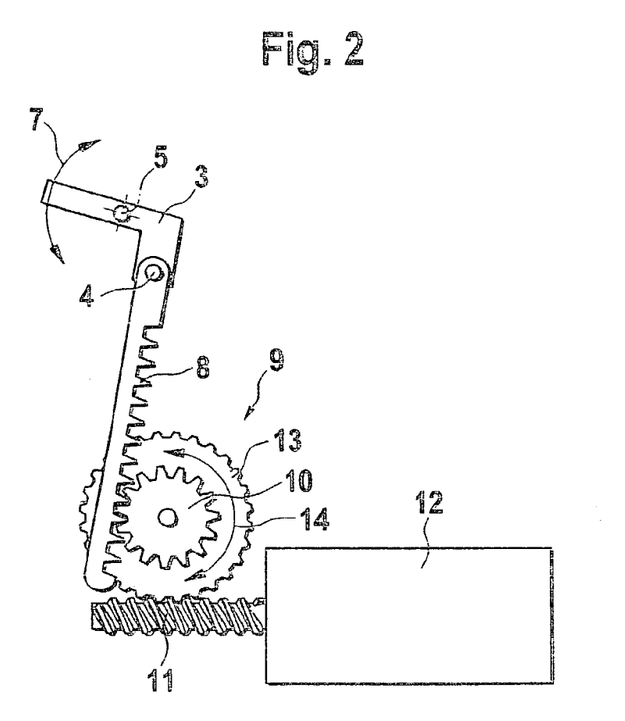

Control drives known in the related art are shown in the illustrations in FIGS. 1 and 2.

Based on the illustration according to FIG. 1 as well, a piston/cylinder arrangement 1 is known in which a piston moves up and down in a closed cylinder in the direction of motion 6. At the pivot point 4, a coupling element 2 is hinge-mounted on the piston capable of being moved in the cylinder, and it is supported hingedly on a swiveling lever 3 at its pivot point 4 furthest away from the piston. The swiveling lever 3—which is designed in the shape of an L in the illustration according to FIG. 1—is capable of being swivelled around a pivot axis and travels the pivot path illustrated with the double arrow 7. The illustration according to FIG. 2 can be found in an electric drive 12 that cooperates with a worm gear 13 by means of an armature shaft 11 on which a worm can be integrally molded, for example. The worm gear 13 is equipped with worm-gear external teeth corresponding to the teeth on the armature shaft 11 and is capable of being rotated in both directions of the double arrow 14. A pinion 10—equipped with external teeth, for example—is supported coaxially with the worm gear 13 of the gear arrangement 9, the external teeth of which said pinion cooperate with a rack 8 that is equipped with external teeth on the side closest to the pinion 10. The rack 8 is supported at pivot point 4 on a swiveling lever 3 that can be moved around a pivot axis 5, and the exposed end of which performs a swiveling motion indicated by reference numeral 7 in both directions of the double arrow.

Figure 3:
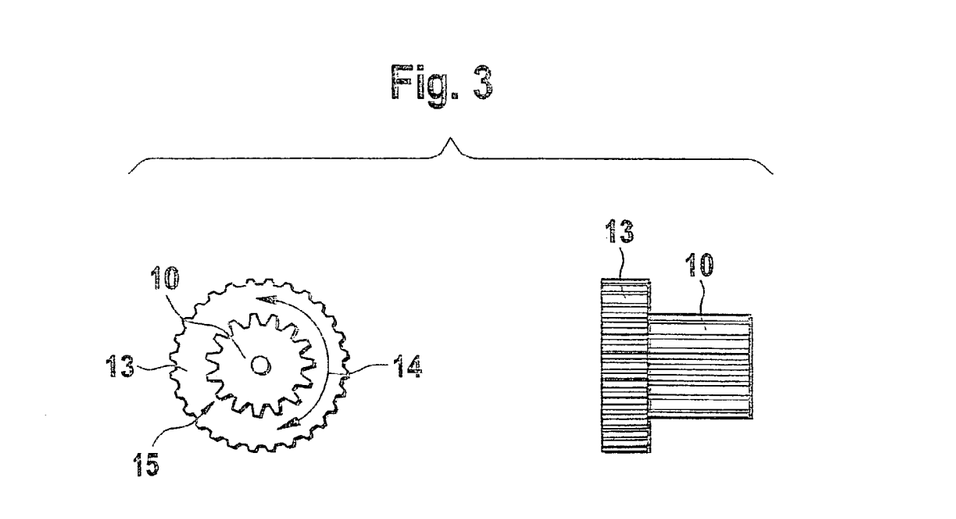
FIG. 3 shows a meshed worm gear/pinion arrangement.

The illustration according to FIG. 3 shows the arrangement of the meshed worm gear and externally-toothed pinion 10. In the top view and the side view of a combination worm gear-pinion arrangement, it is clear that both force-transmitting elements 10 and 13 are supported coaxially in relation to each other. A worm gear-external toothing is located on the outside of the worm gear 13, while the pinion 10 is equipped with external teeth that can be straight or helical. The external teeth 15 of the pinion 10 are not shown in the illustration in FIG. 3; the worm gear 13 can be moved in either direction of the double arrow 14 shown in FIG. 3, depending on the direction of rotation of the electric actuator, on the armature shaft 11 of which a worm can be integrally molded.

Figure 41:
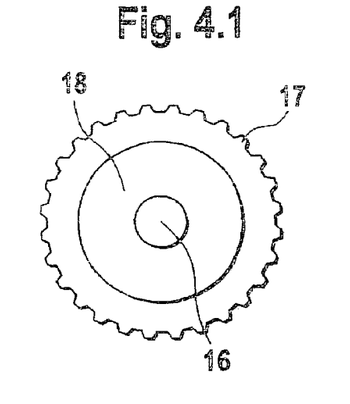
Figure 42:
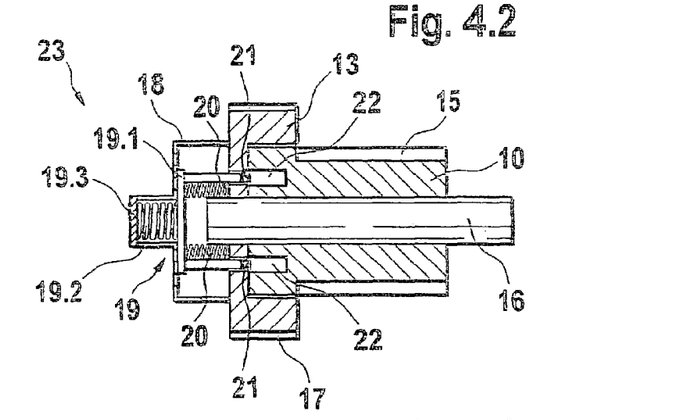

The illustrations in FIGS. 4.1 and 4.2 show a top view and a sectional view of a worm gear/pinion arrangement according to FIG. 3 in the de-energized state.

Shown in greater detail in the top view according to the illustration in FIG. 4.1 is the coaxial support of a worm gear 13 equipped with worm gear 15 on a housing shell 18 and on a bearing shaft 16 supporting these elements.

The sectional view according to FIG. 4.2 shows the worm gear/pinion arrangement in the de-energized state 23. The pinion 10 equipped with external teeth 15 is supported in rotatable fashion on the bearing shaft 16. The external teeth 15 on the pinion 10 functioning as a force-transmitting element can be straight or helical. The pinion 10, which is located on the bearing shaft 16 in rotatable fashion, extends partially into a pinion receptacle 26 of the worm gear 13 and is surrounded by a worm gear 13 equipped with worm gear 15. The worm gear 13 according to the illustration in FIG. 4.2 is supported in rotation-resistant fashion on the bearing shaft 16, e.g., it is shrunken onto it in a manner that creates a press fit.

According to the illustration in FIG. 4.2, opposing drop-in openings 22 are formed on the force-transmitting element designed as a pinion 10. The side walls of the drop-in openings 22 can be equipped with chamfers—not shown here—to facilitate the insertion of coupling pins.

A housing shell 18 is provided on the front side of the worm gear 13 equipped with worm gear 15. The housing shell 18 encloses a throwout element 19 that comprises an adjusting element 19.2, a coupling part 19.1, and a heating/insulation element 19.3. In the exemplary embodiment shown in FIGS. 4.1 and 4.2, the adjusting element 19.2—preferably designed as a coil spring—can be heated either directly or indirectly by means of an insulation or heater 19.3 enclosing the adjusting element 19.2. As a result, the adjusting element 19.2 can be used as a shape-memory element. The adjusting part 19.2 of the throwout element 19 functioning as the shape-memory element acts on a coupling part 19.1 of the throwout element. This is preloaded by means of one or more return spring elements 20 against a front wall of the worm gear 13.

Moreover, pin-shaped claws that penetrate the worm gear 13 in holes 21 or openings are installed on the coupling part 19.1, which said claws slide into the aforementioned drop-in openings 22 of the force-transmitting element configured as a pinion 10.

In the sectional view of the worm/pinion arrangement according to FIG. 4.2, the throwout element 19 is located in a position that makes a relative rotation possible between the force-transmitting elements, i.e., worm gear 13 and pinion 10. In this state, the adjusting element 19.2 of the throwout element 19 serving as the shape-memory element is not heated by the heater 19.3, i.e., the return spring elements 20 seated in the housing 18 on a front side of the worm gear 13 press the coupling part 19.1 in the direction toward the adjusting part 19.2, so that the pin-shaped claws remain outside of the majority of drop-in openings 22 on the end face of the force-transmitting element designed as a pinion 10 opposite from the coupling part 19.1. When the pin-shaped claws disengage from the drop-in openings 22, a relative motion is possible of the pinion 10—that is capable of being rotated on the bearing shaft 16—relative to the worm gear 13 accommodated on the bearing shaft 16 in rotation-resistant fashion.

Figure 51:
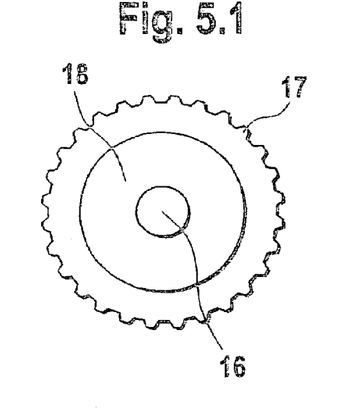
Figure 52:
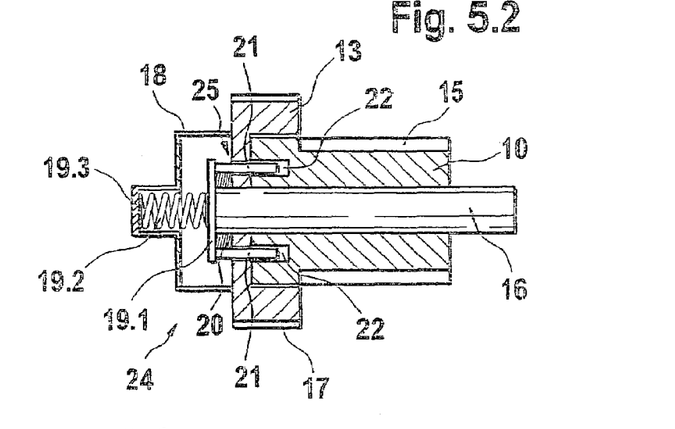

A top view and an illustration of a worm gear/pinion arrangement according to FIG. 3 in the energized state are shown in greater detail in the illustrations according to FIGS. 5.1, 5.2.

The top view shown in FIG. 5.1 corresponds to the illustration described previously in conjunction with FIG. 4.1.

It is obvious in the sectional drawing 5.2 of the worm gear/pinion arrangement in the energized state 24 that, in this case, the dilatation produced by heating the shape-memory element, i.e., the adjusting element 19.2, acts against the return springs 20 that bear against an end face of the worm gear 13. As a result of the dilatation of the adjusting element 19.2 when current is supplied directly or when heat is applied via the housing shell 18, the coupling part 19.1 is moved against the effect of the return springs 20 in the direction toward the worm gear 13. The claws designed in the shape of pins on the coupling wheel 19.1 enter the drop-in openings 22 of the pinion 10 serving as a force-transmitting element. As a result, a positive connection is created between the worm gear 13 equipped with worm gear 15 and accommodated on the bearing shaft 16 in rotation-resistant fashion and the pinion 10 accommodated on the bearing shaft 16 in rotatable fashion. In this state—which reflects the energized state 24 of an electric actuator 12—the transmission of force is established between the force-transmitting elements 10 and 13. The insertion motion of the claw elements designed preferably in the shape of a pin and located on the coupling part 19.1 into the drop-in openings 22 on the end face of the pinion 10 opposite from the coupling part 19.1 is supported by a slow ¼ turn of the electric actuator 12, so that, after the supply voltage is switched on, a secure insertion of the claw-shaped elements of the coupling part 19.1 into the drop-in openings 22 of the pinion 10 can be ensured.

The shape-memory element designed preferably as adjusting part 19.2 is activated by heating, i.e., by applying a voltage. A positive connection, a blockage of the force-transmitting elements 13 and/or 10 is possible only after a supply voltage has been switched on. The response time of the adjusting part 19.2 depends on the heating and lies in the range of 1 to 2 seconds. If the adjusting element 19.2 is designed containing an NiTi alloy, the temperatures at which the adjusting element 19.2 makes it motion can be set in wide ranges. In the case of the material combination mentioned, functioning temperatures can be set in the range between −30° C. and 350° C. The adjusting element 19.2 is preferably designed so that It has a slight hysteresis and the longest-possible conversion temperatures in order to minimize the thermal load on the surroundings and to minimize the energy loss.

Figure 61:
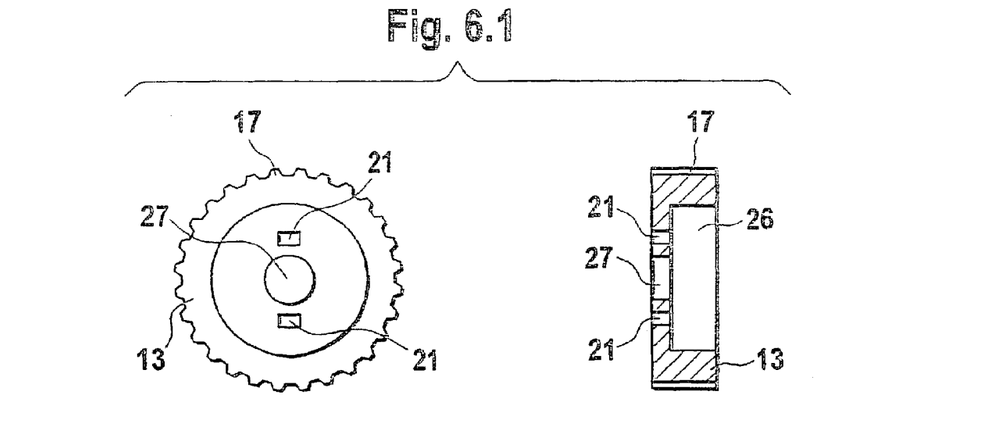

An illustration of the worm gear is shown in the illustration according to FIG. 6.1.

From the top view in FIG. 6.1 it is clear that the worm gear 13—equipped with worm gearing 17—comprises a bearing shaft hole 27 with which the worm gear 13 can be shrunken onto the bearing shaft 16. The openings are shown in the worm gear 13 using position numerals 21, through which the pin-shaped claw elements of the coupling part 19.1 (refer to the illustration in FIG. 5.2 as a comparison) penetrate the worm gear 13. The pinion receptacle is shown clearly in the sectional drawing according to FIG. 6.1, which said recess accommodates a part of the pinion 10 functioning as force-transmitting element and cooperating with the worm gear 13. The pinion 10 not shown in FIG. 6.1 is arranged coaxially on the bearing shaft 16 on which the worm gear 13 can be secured by means of a press fit.

Figure 62:
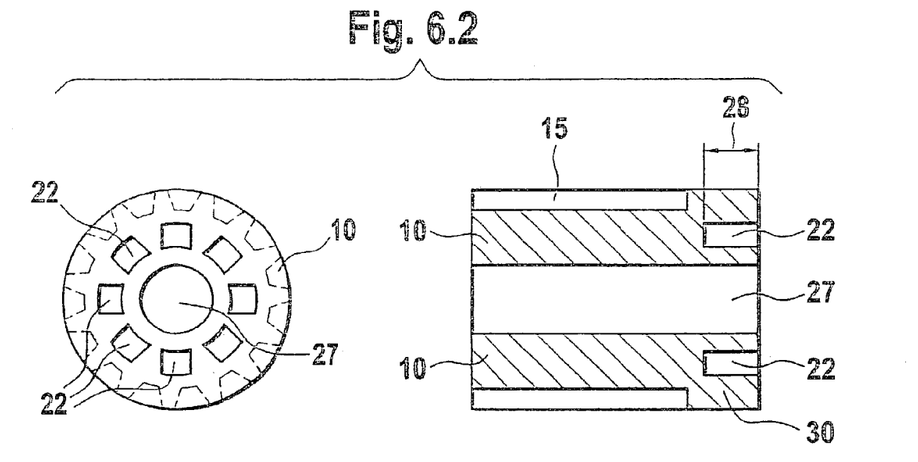

The illustration according to FIG. 6.2 shows an illustration of the force-transmitting element functioning as pinion.

In the top view of the pinion 10, it is clear that it also contains a bearing shaft hole 27 through which a bearing shaft 16 is guided and on which the pinion 10 is accommodated in rotatable fashion. A number of drop-in openings 22 are provided around the circumference of the pinion element 10. There are 8 drop-in openings 22 in the top view according to FIG. 6.2, for example. According to the sectional drawing in FIG. 6.2, the drop-in openings 22 are designed with a depth 28 that ensures that the pin-shaped claws of the coupling part 19.1 of the throwout element 19 are inserted securely. The wall 30 of the drop-in openings 22 can be equipped with a chamfer to facilitate easier insertion of the pin-shaped claw elements formed on the coupling part 19.1.

Figure 63:
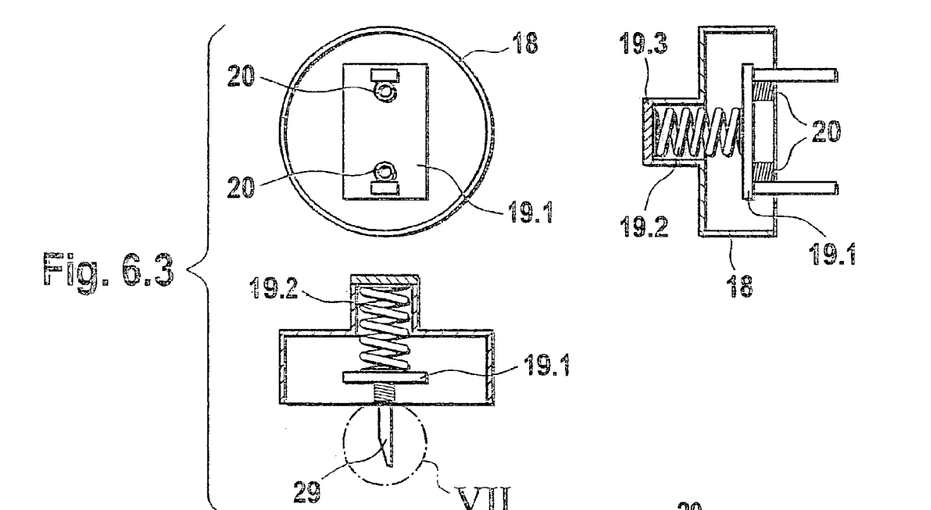

The throwout element 19 is shown in greater detail in the illustration in FIG. 6.3. The throwout element according to the illustration in FIG. 6.3 comprises a housing shell 18 on which an insulation/heating element 19.3 is located. It encloses the adjusting part 19.2 functioning as shape-memory element in such a fashion that the adjusting part 19.2 can be heated by the wall and a thermal expansion of the adjusting element 19.2 is achieved that makes it possible for the coupling part 19.1 to be pushed against the effect of the return spring 20. If the power supply to the heating element 19.3 fails, the adjusting element 19.2 assumes its original position, i.e., the coupling part 19.1 is moved back in the direction toward the now unheated adjusting part 19.2 by the force of the return spring 20.

Figure 7:
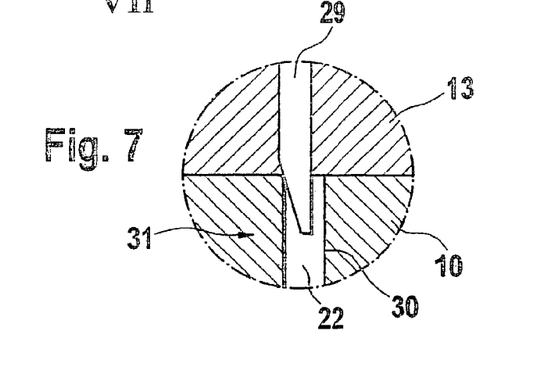
FIG. 7 shows the throwout element in detail, FIG. 8.1 shows a further exemplary embodiment with throwout element integrated in the housing, in the energized state, and FIG. 8.2 shows a further exemplary embodiment with throwout element integrated in the housing, in the de-energized state.

The illustration in FIG. 7 shows that the pins 29 of the coupling part 19.1 functioning as claws can have slight chamfers in the anterior region. Chamfered walls 30 can also be provided in the drop-in openings 22 that are located in the pinion 10 functioning as force-transmitting element, by way of which the friction between the pins 29 of the coupling part 19.1 and the walls of the drop-in openings 22 in the pinion 10 can be reduced.

As an additional security measure, it is ensured that, if the adjusting part 19.2 serving as shape-memory element becomes damaged, the two return springs 20 push the chamfered pins 29 of the coupling part 19.1 out of the drop-in openings 22 of the pinion 10.

The power supply to the adjusting element 19.2 serving as shape-memory element or to the insulation and/or heating element 19.3 enclosing it can take place by means of highly-flexible single cores, since the worm/pinion arrangement 10, 13 makes only a few revolutions. After the vehicle motor is shut off, the electric actuator 12 always returns to its original position. The heating of the adjusting element 19.2 can take place by energizing said adjusting element directly, or the heating can take place via the only one heated wall 19.3 of the housing shell 18.

Figure 81:
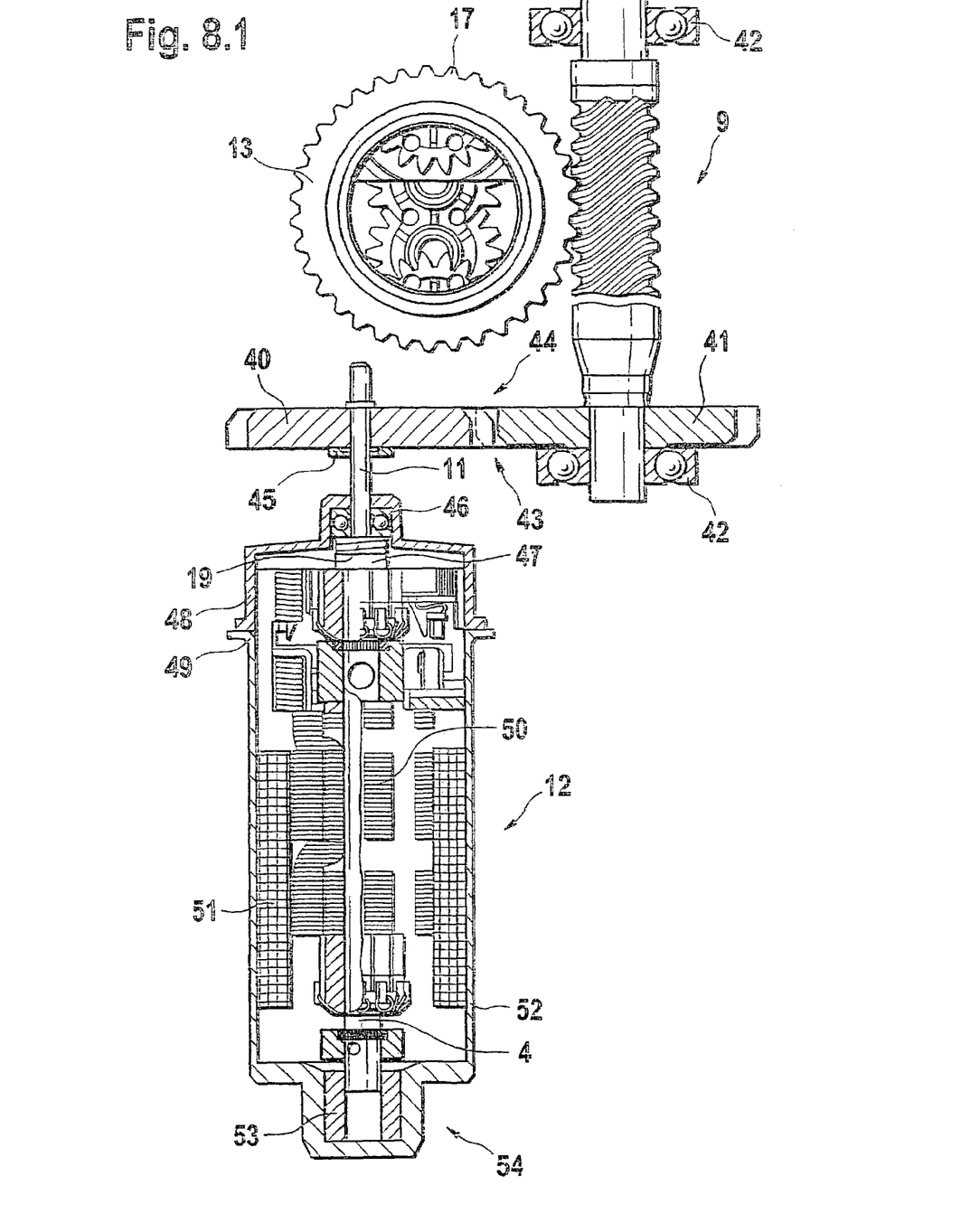

A further exemplary embodiment of the object to be attained as proposed according to the invention having a return element integrated in the housing is shown in the energized state in the illustration in FIG. 8.1.

In the energized state 54, an electric actuator 12 drives a gear arrangement 9, whereby a driven wheel 40 is located on the armature shaft 11 of the electric actuator 12, which said driven wheel meshes with a drive wheel 41 of the gear arrangement. The shaft of the gear arrangement 9 on which the drive wheel 41 is located is supported in bearings 42; a worm is integrally molded on the shaft, which said worm meshes with the thrown out element 19 of a worm gear 13.

The driven wheel 40 located on the armature shaft 11 of the electric actuator 12 transmits the torque to the drive wheel 41 at the point of force transmission 44. The driven wheel and drive wheels 40 and 41 can have either straight teeth or helical teeth. Helical teeth on the driven wheel and drive wheels 40 and 41 are to be preferred because they are quieter; moreover, gears with helical teeth mesh more easily during coupling and decoupling.

In the energized state 54 of the electric actuator 12, current flows through the stator laminations 51 representing the stator windings and housed in the pole pot-type casing 52, and through the armature laminations 50 on the armature shaft 11. Said stator laminations and armature laminations are therefore easily held by the permanent magnets against the force of the preloaded throwout element 19 in the operating position shown in FIG. 8.1 and representing the energized state 54. The throwout element 19—which preferably surrounds the armature shaft 11—is preferably seated against a radial/axial bearing 46 located in a housing part 48 and against a collar 47 formed on the armature shaft 11. The position of the armature shaft 11 relative to the pole pot-type casing 52 shown in FIG. 8.1 is also assumed every time the electric actuator 12 changes direction, since the electromagnetic field does not collapse. If the power fails, on the other hand, only the stop torque acts between the laminations 50 of the armature shaft 11 and the laminations 51 on the stator on the inside of the pole pot-type casing 52, i.e., the force with which the laminations 50, 51 are held in position by the permanent magnets.

Figure 82:
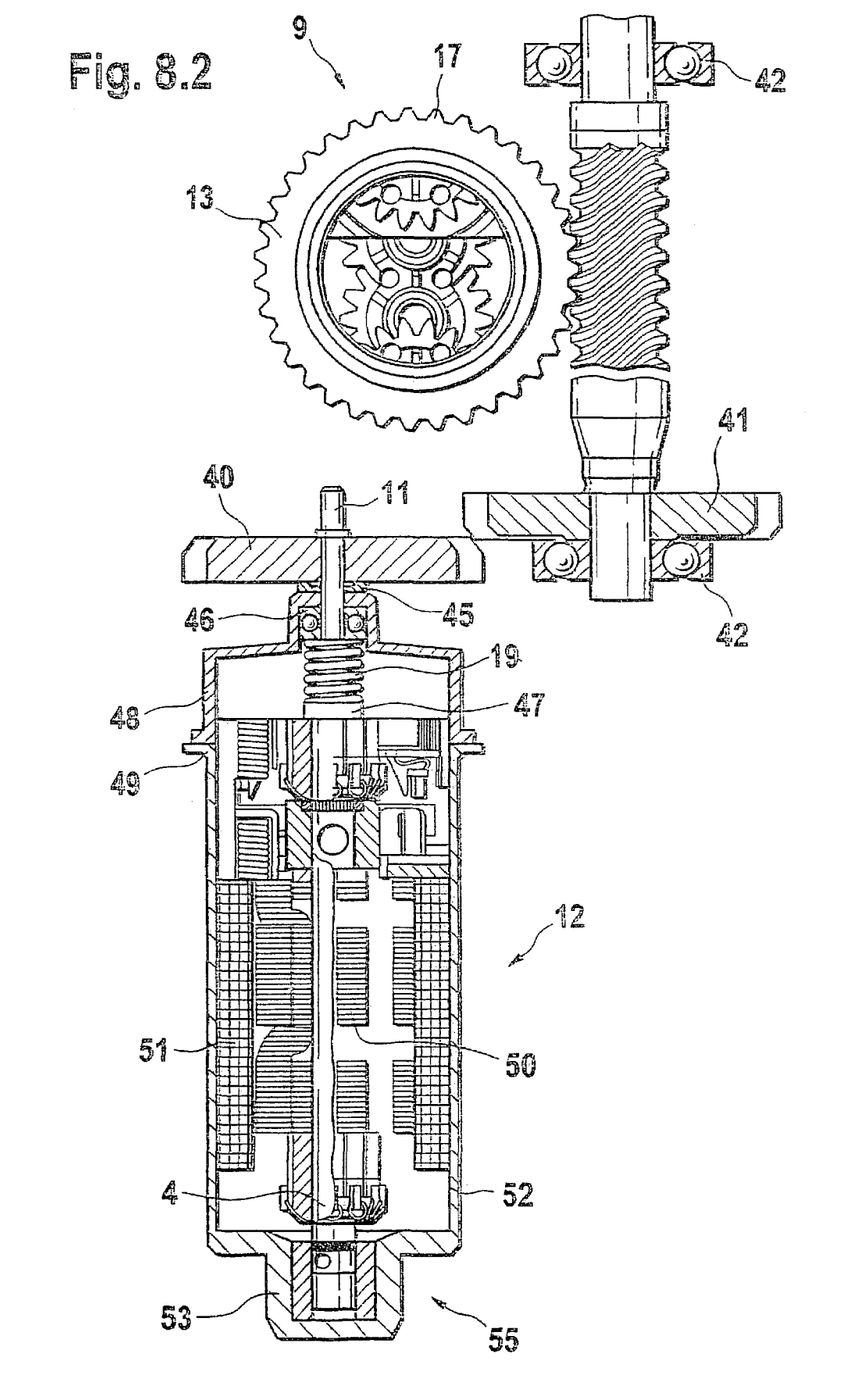

The spring force of the throwout element 19 formed preferably as a coil spring is designed so that it exerts a spring force that exceeds the holding force exerted by the permanent magnets, so that the throwout element 19 presses the armature shaft 11 and the driven wheel 40 provided with a friction washer 45 and located on said armature shaft in the direction toward the armature bearing 53. As a result, the transmission of force between the teeth of the driven wheel 40 and the drive wheel 41 is stopped. The throwout element 19 moves into its nearly strain-free state shown in FIG. 8.2 and presses the armature shaft 11 into the armature shaft bearing 53.

The gear arrangement 9 that is connected downstream from the driven wheel (40) and drive wheel (41) is preferably designed so that it poses as little resistance as possible to adjustment by forces exerted by the control system, to ensure that any possible adjustments can be carried out even if the power fails. In the example of the gear arrangement 9 shown, the worm integrally molded on the driven wheel 40 accommodated in the bearings 42 is to be designed with as little self-inhibition as possible, so that a relative adjustment of the worm and worm gear 13 in relation to each other can be carried out. Since, by selecting suitable gear sizes, the additional gear arrangement 9 can make an important contribution to the ability to obtain gear reduction or overdrive for decoupling purposes, it is often possible to eliminate greatly inhibiting gear members and to limit the design to spur gears, planetary gears, or other easy-glide gears, as shown in the illustrations according to FIGS. 8.1 and 8.2.

FIG. 8.2 shows the arrangement according to FIG. 8.1 with a throwout element integrated in the housing, in the de-energized state.

If the power fails, the transfer of torque at the driven wheel 40 and drive wheel 41 is decoupled by means of the axial displacement of the armature shaft 11 in the housing part (48) and the pole pot-type casing 52 of the electric actuator 12. In this state, relaxation of the preloaded throwout element 19 causes the friction washer 45 to bear against the housing part 48, i.e., the driven wheel 40 and drive wheel 41 are moved out of mesh. In this state, the armature shaft 11 of the electric actuator 12 is retracted completely into its meshing teether 53 in the pole pot-type casing 52.

If the electric actuator is energized once more after the power supply is restored, the magnetic force causes the armature shaft to be drawn into its working position in such a fashion that the insertion motion is dampened by a slow preloading of the throwout element 19. If the electric actuator 12 is controlled in such a fashion that it rotates slowly during axial displacement of the armature shaft 11 into its working position, the two sets of teeth on the driven wheel 40 and the drive wheel 41 can mesh well.

In order to detect the instantaneous position of the armature shaft 11, it can be moved—once it reaches its operating position—into an end position where an end position sensor is located that communicates the actual position of the armature shaft 11 of the electric actuator 12 to vehicle electronics. In this fashion, a power-failure situation, so to speak, can be repeated with any rate of frequency, limited only by the service life of the friction washer 45.

The repeatable emergency operation of the control drive shown in the energized state 54 and in the case of a power failure 55 in FIGS. 8.1 and 8.2, respectively, is the main advantage of the arrangement proposed according to the invention. Due to the possible arrangement of the gear arrangement 9 as a continuation of the armature shaft 11, this means of attaining the object requires hardly any more space than known means of attaining the object. The extension of the stator laminations 52, the throwout element 19 to be provided in addition, and the bearing 46 that supports axial forces represent relatively minimal modifications to existing systems and can therefore be realized in economical fashion. The gear reduction or overdrive available with the gear arrangement 9 can be utilized directly.

In the energized state 54 of the electric actuator 12 according to the illustration in FIG. 8.1, it is to be ensured that the electric actuator—during normal operation—is permanently energized by at least 7 to 10% so that electromagnetic field forces that are always sufficiently strong can be obtained, which said electromagnetic field forces prevent an undesired decoupling or coupling of the armature shaft 11 at every operating instant in the energized state 54.

In addition to the possible arrangement of a throwout element 19 shown in FIGS. 8.1 and 8.2, various other means of attaining the object are feasible as the driver or initiator of the axial displacement of the armature shaft 11. If the intrinsic weight is sufficient and the geometric arrangement is appropriate, the armature shaft 11 can also be displaced by the weight. A further possible usable principle is the use of helical toothing with the additional gear arrangement 9 that exerts a force component on the armature shaft 11 in the desired direction. Additionally, pneumatic or hydraulic drives can also be provided if such a drive is already provided anyway in the vicinity of the electric actuator 12. Moreover, an additional permanent magnet can be provided, e.g., in the vicinity of the friction washer 45, which continues to function for at least a certain length of time when current is not supplied.

The decoupling system proposed according to the invention can also be used with brushless 42-volt engines such as BLDC or SR engines.

REFERENCE NUMERALS

1 Piston-cylinder arrangement
2 Coupling element
3 Swiveling lever

4 Pivot point
5 Pivot axis
6 Direction of motion of piston
7 Pivot motion
8 Rack
9 Gear arrangement
10 Pinion
11 Armature shaft
12 Electric drive
13 Worm gear
14 Direction of rotation
15 External teeth
16 Bearing shaft
17 Worm gearing
18 Housing shell
19 Throwout element
19.1 Coupling part
19.2 Adjusting part
19.3 Insulation/Heater
20 Return spring
21 Hole
22 Drop-in opening
23 De-energized state
24 Blocked state, energized
25 Retracted throwout element
26 Pinion receptacle
27 Bearing shaft hole
28 Depth of drop-in opening
29 Chamfered pin on coupling part
30 Chamfered wall of drop-in opening
31 Direction of force transmission
32 Plate
40 Driven wheel
41 Drive wheel
42 Bearing
43 Meshing teeth (straight/helical)
44 Point of force transmission
45 Friction washer
46 Axial/radial bearing
47 Shaft shoulder
48 Housing part
49 Kerf
50 Armature lamination
51 Stator lamination
52 Pole pot-type casing
53 Armature shaft bearing
54 Energized state
55 De-energized state

What is claimed is:

1. A control drive for operating drive components or adjusting components in motor vehicles, whereby the control drive comprises an electric actuator (12) that acts on force-transmitting elements (10, 13; 40, 41), with which the adjusting motion is transmitted to the drive or adjusting components to be adjusted,
wherein a throwout element (19) is provided that interrupts the transmission of force by the force-transmitting elements (10, 13; 40, 41) in the de-energized state of the electric actuator (12), wherein the throwout element (19) is directly heatable, and wherein a heating/insulating element (19.3) is provided for directly heating the throwout element (19).

2. The control drive according to claim 1, wherein the throwout element (19) is enclosed in a housing (18, 48) and is opposite to a shaft element (11, 16) or is housed such that it encloses said shaft element.

3. The control drive according to claim 1, wherein the throwout element (19) bears against a shoulder (47) of an armature shaft (11) or against a force-transmitting element (13) via a coupling part (19.1).

4. The control drive according to claim 1, wherein the throwout element (19) is designed in the shape of a coil spring.

5. The control drive according to claim 4, wherein the throwout element (19) is accommodated on the armature shaft (11) of an electric actuator (12).

6. The control drive according to claim 4, wherein a force-transmitting element (14) functioning as a driven wheel and having a friction washer (45) as axial stop is accommodated on the armature shaft (11) of the electric actuator (12).

7. A control drive for operating drive components or adjusting components in motor vehicles, whereby the control drive comprises an electric actuator (12) that acts on force-transmitting elements (10, 13; 40, 41), with which the adjusting motion is transmitted to the drive or adjusting components to be adjusted,
wherein a throwout element (19) is provided that interrupts the transmission of force by the force-transmitting elements (10, 13; 40, 41) in the de-energized state of the electric actuator (12), wherein the throwout element (19) is directly heatable,
wherein the throwout element (19) comprises a coupling part (19.1), an adjusting part (19.2), and a heating/insulating element (19.3).

8. The control drive according to claim 7, wherein the adjusting part (19.2) of the throwout element (19) contains a shape-memory alloy.

9. The control drive according to claim 7, wherein the coupling part (19.1) of the throwout element (19) is preloaded against a stop (13) by means of one or more spring elements (20).

10. The control drive according to claim 7, wherein pin-shaped claws (29) are formed on the coupling part (19.1) of the throwout element (19) that engage in drop-in openings (22) of a force-transmitting element (10).

11. The control drive according to claim 10, wherein the pin-shaped claws (29) formed on the coupling part (19.1) of the throwout element (19), and the walls (30) of the drop-in openings (22) are equipped with chamfered walls.

12. The control drive according to claim 7, wherein, when the electric actuator (12) is triggered, it travels a fraction of a revolution in order to make an engagement of the coupling part (19.1)—brought at out by the warming of the drive part (19.2) of the throwout element (10)—in the drop-in openings (22) of the force-transmission components (10) possible.

13. A control drive for operating drive components or adjusting components in motor vehicles, whereby the control drive comprises an electric actuator (12) that acts on force-transmitting elements (10, 13; 40, 41), with which the adjusting motion is transmitted to the drive or adjusting components to be adjusted,
wherein a throwout element (19) is provided that interrupts the transmission of force by the force-transmitting elements (10, 13; 40, 41) in the de-energized state of the electric actuator (12), wherein the throwout element (19) is directly heatable, wherein the throwout element (19) is accommodated on an armature shaft (11) of the electrical actuator (12), and
wherein the armature shaft (11) is housed in the pole pot-type casing (48, 52) in displaceable fashion.

14. A control drive for operating drive components or adjusting components in motor vehicles, whereby the control drive comprises an electric actuator (12) that acts on force-transmitting elements (10, 13; 40, 41), with which the adjusting motion is transmitted to the drive or adjusting components to be adjusted,
 wherein a throwout element (19) is provided that interrupts the transmission of force by the force-transmitting elements (10, 13; 40, 41) in the de-energized state of the electric actuator (12), wherein the throwout element (19) is directly heatable, wherein the throwout element (19) is accommodated on an armature shaft (11) of the electrical actuator (12), and
 wherein an operating position sensor and an end position sensor are accommodated on the armature shaft (11) of the electric actuator (12).

15. A control drive for operating drive components or adjusting components in motor vehicles, whereby the control drive comprises an electric actuator (12) that acts on force-transmitting elements (10, 13; 40, 41), with which the adjusting motion is transmitted to the drive or adjusting components to be adjusted,
 wherein a throwout element (19) is provided that interrupts the transmission of force by the force-transmitting elements (10, 13; 40, 41) in the de-energized state of the electric actuator (12), wherein the throwout element (19) is directly heatable, wherein the throwout element (19) is accommodated on an armature shaft (11) of the electrical actuator (12), and
 wherein the electric actuator (12) is supplied with current during operation in such a fashion that the electromagnetic forces acting between the armature laminations (50) and the stator laminations (51) exceed those produced by the throwout element (19).

16. A control drive for operating drive components or adjusting components in motor vehicles, whereby the control drive comprises an electric actuator (12) that acts on force-transmitting elements (10, 13; 40, 41), with which the adjusting motion is transmitted to the drive or adjusting components to be adjusted,
 wherein a throwout element (19) is provided that interrupts the transmission of force by the force-transmitting elements (10, 13; 40, 41) in the de-energized state of the electric actuator (12),
 wherein the throwout element (19) comprises an adjusting part (19.2),
 wherein the adjusting part (19.2) is heatable directly via the housing (19) enclosing it.

17. The control drive according to claim 16,
 wherein the throwout element (19) is enclosed in a housing (18, 48) and is opposite to a shaft element (11, 16) or is housed such that it encloses said shaft element.

18. The control drive according to claim 16,
 wherein the throwout element (19) bears against a shoulder (47) of an armature shaft (11) or against a force-transmitting element (13) via a coupling part (19.1).

19. The control drive according to claim 16,
 wherein the throwout element (19) is designed in the shape of a coil spring.

20. The control drive according to claim 19,
 wherein the throwout element (19) is accommodated on the armature shaft (11) of an electric actuator (12).

21. The control drive according to claim 19,
 wherein a force-transmitting element (14) functioning as a driven wheel and having a friction washer (45) as axial stop is accommodated on the armature shaft (11) of the electric actuator (12).

22. The control drive according to claim 21,
 wherein the armature shaft (11) is housed in the pole pot-type casing (48, 52) in displaceable fashion.

23. The control drive according to claim 21,
 wherein an operating position sensor and an end position sensor are accommodated on the armature shaft (11) of the electric actuator (12).

24. The control drive according to claim 21,
 wherein the electric: actuator (12) is supplied with current during operation in such a fashion that the electromagnetic forces acting between the armature laminations (50) and the stator laminations (51) exceed those produced by the throwout element (19).

25. The control drive according to claim 16,
 wherein the throwout element (19) additionally comprises a coupling part (19.1), and a heating/insulating element (19.3).

26. The control drive according to claim 25,
 wherein the adjusting part (19.2) of the throwout element (19) contains a shape-memory alloy.

27. The control drive according to claim 25,
 wherein the coupling part (19.1) of the throwout element (19) is preloaded against a stop (13) by means of one or more spring elements (20).

28. The control drive according to claim 25,
 wherein pin-shaped claws (29) are formed on the coupling part (19.1) of the throwout element (19) that engage in drop-in openings (22) of a force-transmitting element (10).

29. The control drive according to claim 25,
 wherein the pin-shaped claws (29) formed on the coupling part (19.1) of the throwout element (19), and the walls (30) of the drop-in openings (22) are equipped with chamfered walls.

30. The control drive according to claim 25,
 wherein, when the electric actuator (12) is triggered, it travels a fraction of a revolution in order to make an engagement of the coupling part (19.1)—brought at out by the warming of the drive part (19.2) of the throwout element (10)—in the drop-in openings (22) of the force-transmission components (10) possible.

* * * * *